(12) United States Patent
Tran

(10) Patent No.: US 7,760,713 B2
(45) Date of Patent: Jul. 20, 2010

(54) CAMERA-PHONE BARCODE SCANNING SUPPORT

(76) Inventor: Bao Q. Tran, 6768 Meadow Vista Ct., San Jose, CA (US) 95135

( * ) Notice: Subject to any disclaimer, the term of this patent is extended or adjusted under 35 U.S.C. 154(b) by 1306 days.

(21) Appl. No.: 11/252,345

(22) Filed: Oct. 16, 2005

(65) Prior Publication Data

US 2006/0083225 A1 Apr. 20, 2006

Related U.S. Application Data

(60) Provisional application No. 60/619,240, filed on Oct. 15, 2004, provisional application No. 60/619,245, filed on Oct. 15, 2004, provisional application No. 60/619,244, filed on Oct. 15, 2004, provisional application No. 60/619,243, filed on Oct. 15, 2004.

(51) Int. Cl.
*H04L 12/66* (2006.01)
(52) U.S. Cl. .......... 370/356; 370/401; 370/468; 379/265.09; 379/265.13; 709/219
(58) Field of Classification Search .......... 370/352, 370/356, 401, 468; 379/265.11, 265.12, 379/265.09, 265.13; 705/1, 14, 39; 707/100; 709/204, 219, 224
See application file for complete search history.

(56) References Cited

U.S. PATENT DOCUMENTS

| | | | |
|---|---|---|---|
| 6,215,783 B1 | 4/2001 | Neyman | |
| 6,295,551 B1 * | 9/2001 | Roberts et al. | 709/205 |
| 6,714,642 B2 | 3/2004 | Dhir et al. | |
| 6,744,858 B1 | 6/2004 | Ryan et al. | |
| 6,968,367 B1 * | 11/2005 | Vassar et al. | 709/219 |
| 7,039,176 B2 * | 5/2006 | Borodow et al. | 379/265.02 |
| 7,130,853 B2 * | 10/2006 | Roller et al. | 1/1 |
| 7,167,899 B2 * | 1/2007 | Lee et al. | 709/204 |
| 7,212,516 B1 * | 5/2007 | O'Sullivan et al. | 370/352 |
| 7,233,980 B1 * | 6/2007 | Holden et al. | 709/219 |
| 7,269,160 B1 * | 9/2007 | Friedman et al. | 370/352 |
| 7,269,567 B1 * | 9/2007 | Pletz et al. | 705/1 |
| 7,493,384 B1 * | 2/2009 | Philyaw | 709/224 |
| 2002/0076031 A1 * | 6/2002 | Falcon et al. | 379/265.11 |
| 2003/0179862 A1 | 9/2003 | Sierra et al. | |
| 2004/0022237 A1 | 2/2004 | Elliott et al. | |
| 2004/0117383 A1 * | 6/2004 | Lee et al. | 707/100 |
| 2004/0125940 A1 | 7/2004 | Turcan et al. | |
| 2005/0165674 A1 * | 7/2005 | Edwards et al. | 705/39 |
| 2005/0288953 A1 * | 12/2005 | Zheng | 705/1 |
| 2006/0053050 A1 * | 3/2006 | Schweier | 705/14 |
| 2006/0062375 A1 * | 3/2006 | Pasquale et al. | 379/265.12 |
| 2009/0225764 A1 * | 9/2009 | Flores et al. | 370/401 |

* cited by examiner

*Primary Examiner*—Gerald Gauthier
(74) *Attorney, Agent, or Firm*—Tran & Associates

(57) ABSTRACT

Systems and methods are disclosed for load balancing call centers and for providing remote receptionist service.

20 Claims, 2 Drawing Sheets scan the product's descriptor using a camera (312)

place a call to a sales support telephone center (314)

route the call to a remote call center (316)

receive sales support from the remote call center (318)

CAMERA-PHONE BARCODE SCANNING SUPPORT

This application claims priority from Provisional Application Ser. Nos. 60/619,240, 60/619,245, 60/619,244, 60/619,243, all filed Oct. 15, 2004, the content of which is incorporated herewith.

BACKGROUND

Call centers are equipped and staffed for the provision to end-users of information services, especially technical support and reservation services. End-users may be: retail consumers, occupants of residential dwellings, hotel guests, tourists, employees of supply channel or distribution channel partners, consultants, internal staff, maintenance contract subscribers, travelers, among others.

Advanced call centers usually comprise: connectivity to public and private wide area networks, a call distribution system (either circuit switched or packet-switched, e.g., Voice over Internet Protocol, data call, instant message, for example), a local area network, applications software, World Wide Web servers, database servers, application servers, workstations, wide area network connectivity, and personnel who operate workstations or "seats" in the call center and interact with callers to the call center.

SUMMARY

In one aspect, a communication system for communicating delay-sensitive data and non delay-sensitive data includes one or more fiberoptic communication cables to transfer voice over internet protocol (VOIP) data; at least one satellite to provide redundant VOIP path; and a plurality of call centers coupled to the cables and the satellite to receive and transmit VOIP data.

In another aspect, a method for providing sales support using a call center includes scanning a product descriptor using a telephone having a camera; placing a call to a sales support telephone center; routing the call to a remote call center; and receiving sales support from the remote call center.

In another aspect, an apparatus for automatically sharing a presentation during a web-conference includes a first computer including an authoring application to generate a shared document with audio; a first viewer; and a communication module to send the shared document with audio over a network; wherein the authoring application is configured to create a shared interactive document for use in a live data conference and the first viewer application is configured to display the shared interactive document on the local computer. A second computer includes a second viewer application, wherein the communication module is configured to send the shared interactive document with to the remote computer and the second viewer application is configured to display the shared interactive document, the shared interactive document being simultaneously displayed by the first viewer application and the second viewer application during the web conference, wherein the communication module combines web conference user voice with audio from the shared document. During the web conference, the user can be presented with interactive and feedback features such as: Multiple Choice or True/False question; Hot Spots (Click Zones); Text Input; or Keystroke capture.

Implementations of the above aspects may include a receptionist at the call center to remotely handle reception tasks. The image and voice of the receptionist is transmitted to a remote location. The image and voice of a remote visitor is transmitted to the receptionist.

Advantages of the system may include one or more of the following. The system provides reliable voice communication without lags. Reliability is enhanced since the communication is distributed over a multi-tier network of fiber optic cables and multiple satellites. Such system enables outsourced work to be cost-effectively distributed across continents. The system allows companies to increase profits by directly or indirectly "outsourcing" certain projects to areas of the world that have an abundant supply of cost effective labor.

BRIEF DESCRIPTION OF THE DRAWINGS

The present invention can be more fully understood by reading the following detailed description together with the accompanying drawings, in which like reference indicators are used to designate like elements, and in which.

DESCRIPTION

The present invention is described in terms of examples discussed below. This is for convenience only and is not intended to limit the application of the present invention. In fact, after reading the following description, it will be apparent to one skilled in the relevant art how to implement the present invention in alternative embodiments.

Figure 1:
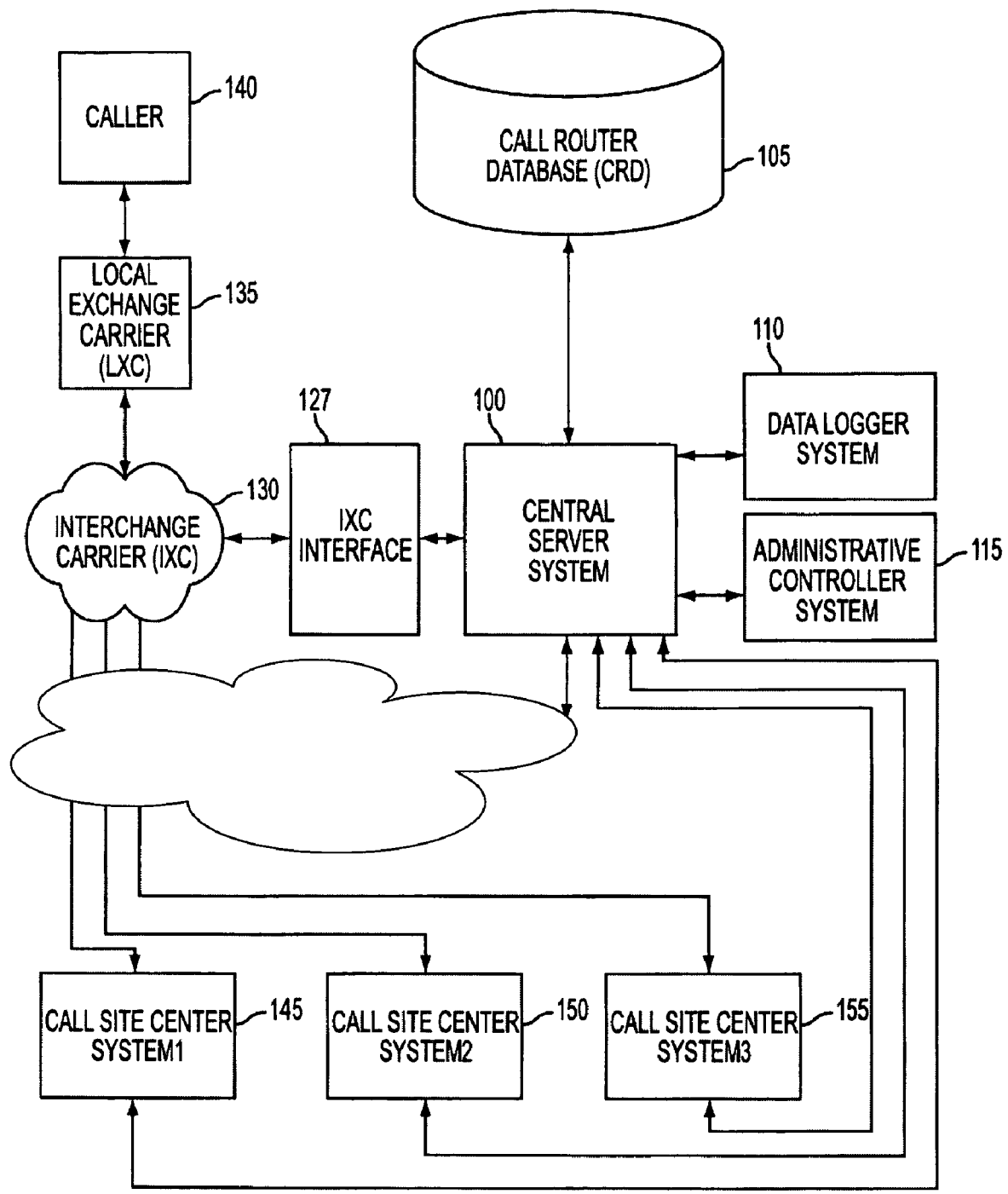
FIGS. 1-2 show exemplary telecommunication structures.

FIG. 1 shows an exemplary telecommunications network that supports remote sales support. In one embodiment, the system includes a server system 100; data logger system 110; administrative controller system 115; call router database 105; call site center system1 145; call site center system 2 150; call site center system 3 155; IXC interface 127; interexchange carrier (IXC) 130; local exchange carrier 135; and caller 140.

Caller 140 represents the caller originating a call that is routed through the call routing system. The caller can be a consumer who seeks service from business concerns using the telephone. For example, a consumer seeking to place an order, schedule a delivery, file a complaint, or query an account balance may place a call to a centralized number provided by a business concern. It is well known that businesses often provide such numbers as so-called toll-free "800" numbers or the like.

Local exchange carrier (LXC) 135 represents that local phone network receiving a customer's call in a local area for forwarding to IXC 130. For example, a customer calling a toll-free 800 number is routed through his/her local phone network to the long distance network, IXC 130. IXC 130 represents the long distance carrier network that is controlled by central server system 100 to route calls to call sites and queues at the different geographic locations. While not depicted in FIG. 1, IXC 130 may further comprise a data access point (DAP) representing the point or node in the long distance switching network that receives return route address data to determine call destination.

The IXC 130 communicates over a network which can be ATM (Asynchronous Transfer Mode) with transport, switching, network management, and customer services built in. ATM is a protocol that handles multimedia traffic over wide area networks (WANs). The protocol is a connection-oriented cell-switched protocol developed for fiberoptic systems which have nearly error-free performance characteristics.

The main features of ATM are guaranteed quality of service, ease of switching, and multimedia compliance. ATM can be easily switched because all switching and routing is performed by using only a 5 byte header. Thus, the switching can be performed with hardware. ATM is multimedia compliant because of the small cell size—a 5-byte header and a 48-byte payload. The small size allows cell delay (jitter) to be readily controlled—a necessity for multimedia transmission such as voice and video. The network may be satellite-based or fiber-optic cable based.

IXC interface 127 represents hardware/software that may be required to convert data transmitted between IXC 130 and central server system 100. Long distance carriers may have data formats (e.g., for the route request and return address) that differ among long distance providers and that may require conversion into a format usable by central server system 100. The IXC interface 127 permits the integration of computers and telephony (often referred to as CTI or computer telephony integration) for the call routing system.

The IXC interface 128 communicates with a central server system 100. The central server system 100 provides centralized control over the call routing and includes hardware and software for supporting system administration, database management, carrier network interface, and call site center systems. In general, the central server system 100 receives routing requests from interexchange carriers (IXC). The central server system processes routing requests, as well as other information, to issue a return route address to IXC to control where a call is routed. As will be discussed in greater detail below, sometimes the return route address causes a call to be forwarded to an IVR system and other times the call is forwarded to one of the call site center systems. While not depicted in FIG. 1, one or more backup servers may be provided for purposes of redundancy to ameliorate or eliminate the effects of crashes, malfunctions and the like.

Regarding the communication between central server system 100 and the other system elements, the interface and protocol may comprise means familiar to those of skill in the art. The interface between system elements may be through direct connection or direct lines or may be over a network, such as the Internet, Wide Area Network (WAN), Local Area Network (LAN) or the like. In one embodiment, call site center systems 1-3 (blocks 145-155) interface with central server 100 over a WAN. Regarding data format for non-voice data (such as real-time status information transmitted from peripherals to central server system 100), TCP/IP protocol is used, although departures therefrom remain within the spirit and scope of the invention.

The central server 100 also communicates with a data logger system 110 for logging activity of the call routing system. For example, data logger system 110 may provide for the storage of records reflecting the path taken by every call entering the call routing system. Data logger 110 may store records reflecting activity levels of various peripherals, such as call centers, so that system administration personnel can evaluate long term loading levels. Data logger system 110 may provide for storage of both short-term transactional data and long term historical data.

The server 100 also communicates with a call router database (CRD) 105 with storage means for storing data for the call router system. CRD 105 can be hard drives, CD-ROM, optical drives and so on. Generally, CRD 105 is accessed by central server system 100 in order to retrieve customer identification and profile or behavior data in order to generate routing strategies and return addresses. CRD 105 is also controlled by central server system 100 to store transaction and history data reflecting activity on the call routing system.

Optionally, one or more interactive voice response (IVR) systems collect information from callers (e.g., using touchtone activated voice menus) in order to route calls to the proper target, such as to a qualified agent at a queue at a call site. In the preferred embodiment, calls are first forwarded (i.e., pre-routed) to one of said IVR systems. Callers can receive automated servicing and access to their accounts using the touchstone controlled menus. Alternatively, callers seeking servicing by a live agent can "dial out" by entering "#" or the like. In that event, additional information can be received in order to recognize the proper account and provide the best return route address to IXC 130. In this embodiment, once the return route address (e.g., for post-routing) is determined by central server system 100, the call may be returned from the IVR to IXC 130 by using a technology such as so-called "take back and transfer" (TNT) technology supported by MCI Corp. Once the call is returned to IXC 130, it is routed to the proper target in accordance with the return route address.

Call site center systems 1-3 (blocks 145-155) comprise call sites for receiving calls forwarded by IXC 130. Generally, said call sites will comprise one or more so-called peripherals capable of receiving calls, such as local VRU's, PBX's (Private Branch Exchange), and ACD's (Automatic Call Distributors). The call sites generally include agents and agent workstations for human-assisted call processing, further discussed below.

In one embodiment, each call site center system interfaces with central server system 100 over a WAN, although those of ordinary skill will appreciate that the interface could encompass other packet-switched technologies for communication between remote systems, such via the Internet, World Wide Web, Internet Protocol Next Generation (IPng), Local Area Network (LAN) and the like. Central server call center interface 302 represents the hardware and software for the interface between call site center systems 145-155 and central server system 100 which, in the preferred embodiment, employs so-called TCP/IP data communications protocol.

The method and apparatus increases the traffic carrying capacity of a satellite network while providing the ability to communicate system overhead data throughout a system. This is achieved using a multi-tier satellite system, where a "satellite tier" includes a group of one or more satellites. In a preferred embodiment, two satellite tiers are used, a first tier including non-GEO satellites and a second tier including GEO satellites. The non-GEO satellites receive and route delay-sensitive data through the non-GEO network. In addition, the non-GEO satellites receive non delay-sensitive data which the non-GEO satellites route to a GEO satellite. Thus, some or all of the non delay-sensitive data is not routed through the non-GEO network, which effectively increases the system capacity by enabling more of the non-GEO communication resources to be used for communication of delay-sensitive data (e.g., voice data).

The method and apparatus of the present invention could be used, for example, as a backbone network for terrestrial networks (e.g., terrestrial cellular and PCS wireless systems). Such terrestrial networks could set up their global call delivery and routing through the non-real time satellite tier (e.g., GEO satellites) and route the real-time traffic (e.g., voice) through the real-time satellite tier (e.g., non-GEO satellites).

Figure 2:
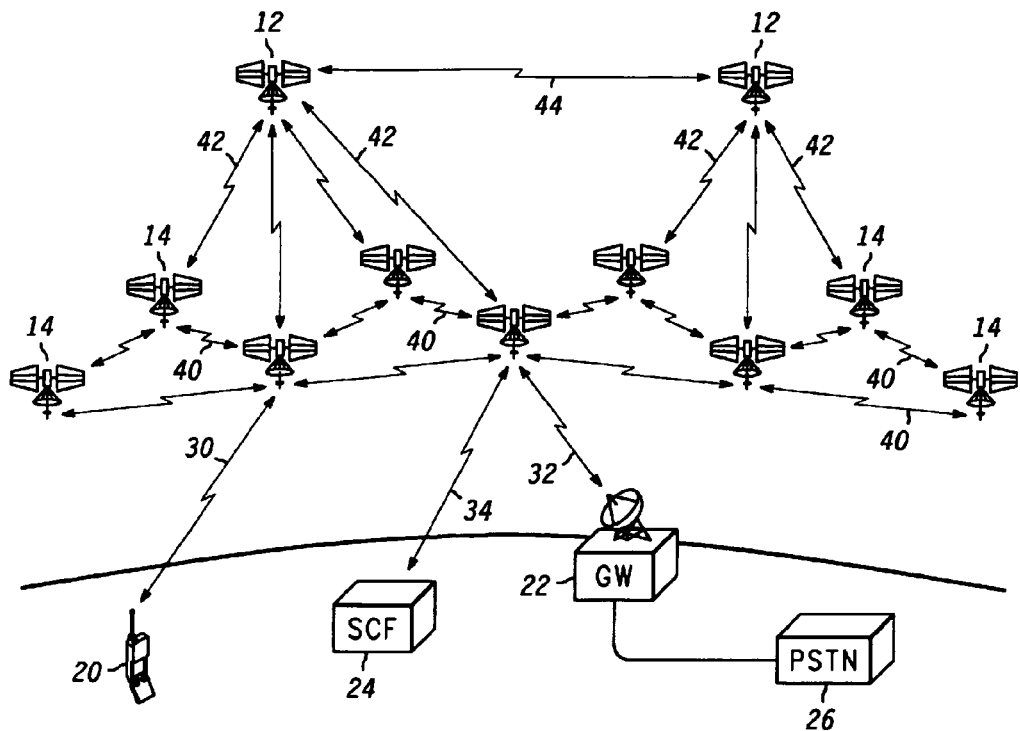

FIG. 2 illustrates a satellite communication system which includes GEO and non-GEO satellites in accordance with a preferred embodiment of the present invention. System 10 includes one or more GEO satellites 12 and one or more non-GEO satellites 14. In a preferred embodiment, non-GEO satellites 14 are LEO satellites. LEO satellites 14 communicate with equipment 20, 22, 24 located at, below, or above the surface of the earth. For example, LEO satellites 14 communicate over link 30 with a fixed or mobile communication unit 20 which can be a portable, hand-held telephone, pager, or data device. Communication unit 20 could be located anywhere on or above the surface of the earth. In some applications, communication unit 20 also could be located underwater or underground. In addition, communication unit 20 could interface with a LEO satellite 14 through a single communication channel, or could be a communication unit that interfaces with a LEO satellite 14 using multiple communication channels.

LEO satellites 14 communicate over link 32 with gateway (GW) 22 which functions to interface system 10 with other communication systems 26 (e.g., public switched telephone networks or terrestrial cellular systems). In a preferred embodiment, gateway 22 also assists in performing functions such as call setup, billing, and other user services. LEO satellites 14 also communicate over link 34 with system control facility (SCF) 24. System control facility 24 could be incorporated into a gateway 22 or could exist as a standalone facility. System control facility 24 desirably receives telemetry information from satellites 14 and performs system control functions necessary for the operation of system 10.

In a preferred embodiment, GEO satellites 12 and LEO satellites 14 also communicate between each other over LEO crosslinks 40, LEO-GEO links 42, and GEO crosslinks 44. LEO crosslinks 40 between LEO satellites 14 are used, in a preferred embodiment, to carry delay-sensitive data such as user voice information created during a call. When a LEO satellite 14 receives such information from equipment 20 or 22, for example, LEO satellite 14 would, when appropriate, either route the delay-sensitive data back to equipment on the ground or would route the delay-sensitive data over a LEO crosslink 40. In an alternate embodiment, LEO satellites 14 could transfer data between themselves using bent-pipe links through ground equipment, rather than by using links 40.

LEO-GEO links 42 exist between LEO satellites 14 and GEO satellites 12. In a preferred embodiment, links 42 would carry non delay-sensitive data. When LEO satellites 14 receive such non delay-sensitive data, LEO satellites 14 would, when appropriate, either route the non delay-sensitive data back to equipment on the ground or would route that data over links 42 to GEO satellites 12, rather than routing the data over LEO crosslinks 40. Except for that non delay-sensitive data which is destined for ground equipment with which a LEO satellite 14 can directly communicate, the LEO satellite 14 routes some or, preferably, all non delay-sensitive data through GEO satellites 12.

By reducing or eliminating the quantity of non delay-sensitive data sent through LEO crosslinks, the method and apparatus allows most or all of the LEO crosslink capacity to be used for delay-sensitive data, thus effectively increasing the system capacity by a substantial amount.

In an alternate embodiment, non delay-sensitive data could be sent directly from equipment 20, 22, 24 to GEO satellites 12, rather than being routed through LEO satellites 14. In such an embodiment, equipment 20, 22, 24 would be required to have transmission power levels and equipment sufficient to communicate with GEO satellites 12. Such equipment could be more expensive than equipment necessary to communicate with LEO satellites 12, making direct communication with GEO satellites 12 less desirable.

In another embodiment, links 44 exist between GEO satellites 12, although links 44 are not essential to achieve the advantages of the present invention. Links 44 are convenient where non delay-sensitive data received by a first GEO satellite 12 from a first LEO satellite 14 should be routed through a second LEO satellite 14 which does not communicate directly with the first GEO satellite 12, but does communicate directly with a second GEO satellite 12. Such data could be routed from the first LEO satellite 14, to the first GEO satellite 12, over link 44 to the second GEO satellite 12, and to the second LEO satellite 14.

In an alternate embodiment, GEO satellites 12 could transfer data between themselves using bent-pipe links through LEO satellites 14 or ground-based equipment, rather than using links 44. In another alternate embodiment, MEO satellites could be used in the system rather than, or in addition to, the LEO satellites or GEO satellites.

For illustration purposes only, FIG. 1 shows two GEO satellites 12, nine LEO satellites 14, one communication unit 20, one gateway 22, and one system control facility 24. A system incorporating the method and apparatus of the present invention could have one or any number of GEO satellites 12, LEO satellites 14, gateways 22, and system control facilities 24. In addition, such a system could support numerous communication units 20 of various types and degrees of mobility.

The process for routing data through the system is started when a first LEO satellite receives a data packet. The data packet could originate from another LEO satellite, a GEO satellite, a communication unit, a gateway, or a control facility, for example. The LEO satellite determines the destination of the data packet, for example, by evaluating the packet's header information. A determination is made whether the first LEO satellite is the destination of the data packet. If so, the first LEO satellite consumes or stores the information and the procedure ends. If not, a determination is made, whether a ground-based device (e.g., underwater cable a communication unit, gateway, or control facility) that currently is or is capable of being linked to the LEO satellite is the destination. If so, the LEO satellite sends the data packet to the linked ground device and the procedure ends.

If a linked ground device is not the destination, then a determination is made whether the data packet includes delay-sensitive data. This determination could be made, for example, by examining a bit in the packet header which indicates whether or not the data is delay-sensitive. Alternatively, the data packet header could include a field which indicates the type of packet. For example, if the type field indicates that the packet includes voice data, the packet could be deemed to include delay-sensitive data. The source or destination of the data packet also might be used to make the determination. If the packet is destined for a control facility, for example, it could be deemed to be non delay-sensitive. Any number of criteria could be used to determine whether or not a packet is delay-sensitive.

If the data packet does include delay-sensitive data, the data packet is check first to see if fiber optic cables can be used to route the data and if not the data is routed through the LEO network (e.g., over a LEO crosslink) to the packet's ultimate destination. When a LEO satellite is a destination of the packet, the packet would be routed over LEO crosslinks to the destination LEO. In an alternate embodiment, the packet could be routed over bent-pipe links through ground transceivers. When ground-based equipment is the destination, the packet would be routed over LEO crosslinks to a LEO satellite which is capable of communicating with the destination equipment. That LEO satellite would then route the packet to the equipment. The procedure then ends.

If the data packet does not include delay-sensitive data, the data packet is routed to the GEO network (e.g., over a LEO-GEO link). The GEO network then routes the data packet to its ultimate destination. If a GEO satellite is the ultimate destination, the packet would be routed over GEO crosslinks, if possible, to the destination GEO. In alternate embodiments, the packed could be routed along bent-pipe links through ground transceivers or other satellites. If a LEO satellite (or a ground device serviced by a particular LEO satellite) is the ultimate destination, the data packet is routed through the GEO network to the GEO satellite that is capable of communicating with the destination LEO satellite. That GEO satellite would then route the packet to the LEO satellite (which in turn would route the packet to the destination device, if necessary). The procedure then ends.

Figure 3:
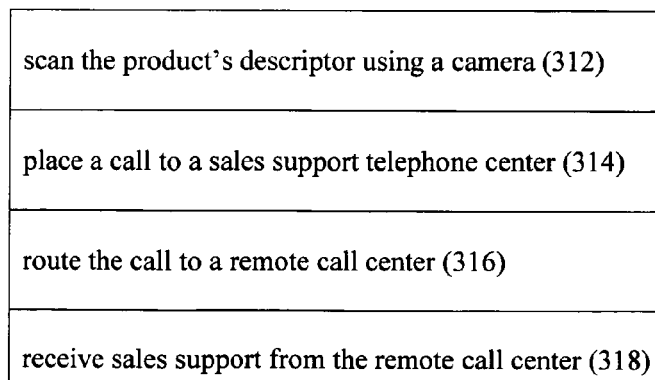
FIG. 3 shows an exemplary process for providing sales support using a cell phone or landline phone and a call center.

FIG. 3 shows an exemplary process for providing sales support using a cell phone or landline phone and a call center. A customer examines a particular product at a store and wishes to learn more about the product. To do this, the customer scans the product's descriptor using a camera (312); places a call to a sales support telephone center (314); routes the call to a remote call center (316); and receive sales support from the remote call center (318).

In one embodiment, the product descriptor is a bar code. The captured image of the bar code is decoded as digital data. The digital data is then used to route the call to an appropriate person in a remote call center that can assist the customer for sales support. The remote call center can be accessed over a satellite link or a fiber-optic link, for example.

The call center VOIP system can be used in conjunction with an interactive sharing system for training call center operators or alternatively for providing scripts to call center operators to handle client calls and queries. In an exemplary process for sharing an interactive presentation among users during a web-conference call, a host user creates a presentation using authoring program. The presentation is stored on server. Next, the host creates an appointment for the conference. When the time comes for the meeting, the host initiates a web conference call and invokes presentation during call. The presentation is downloaded to viewers on the users' computer systems using a communications module. Methods for exchanging such data are known to those skilled in the art, for example these methods are discussed extensively in U.S. Pat. No. 5,623,603, and the disclosure thereof incorporated herein by reference in its entirety. The viewers display the presentation and interact with conferees. During this time, the host and the users can interact verbally or visually over the conferencing system. The viewers collect user's response and update info on server. During or after the conference call, the host can review the user's responses. Also, the users can subsequently view each presentation if desired.

The authoring program can be used by an author to create a sequence of slides along with animations, text and other features for playback at a later time. This is referred to as a presentation that is viewed by a user, or viewer. The authoring program includes basic steps of having the author create screenshots, or slides of an application program, or other information. After screenshots are obtained, the author can further manipulate the screenshots to put them into sequence for a presentation. The author adds cursor movement, cursor transitions, descriptive text, interactive clickable areas and other features, explained in detail, below. The author finalizes the presentation as a Java applet that can be viewed with a web browser. The applet is provided to an end user for playback. The applet is self-contained and can be viewed in a Java-enabled browser without the need for downloading additional executables, plug-ins, etc. The subject of the presentation is typically an application program but can, in general, be any information displayed on a computer. The authoring program uses screenshots of the information as the basis for creating a presentation, or "sequence," of the information. The author can add cursor movements, text, user interaction, and can control the sequence. A human viewer, or user, plays back the presentation at a later time. The presentation is a self-contained file or set of files that is compacted for efficient transport, download and storage. The files are decompressed prior to playback. One version of the authoring program inserts advertising information into the presentation so that the advertisement is visible to a viewer during playback of the presentation.

In one embodiment, the authoring program can be the ViewletBuilder software available from Qarbon. The ViewletBuilder provides fast, easy creation of demos, simulations and tutorials. The ViewletBuilder has branching and hyperlinking provide the ability to customize the viewer experience. Intuitive capture, editing and enhancement features allow non-technical people to create compelling, professional online content. Additionally, ViewletBuilders enable the user to be presented with interactive and feedback features such as:

1. Multiple Choice or True/False questions
2. Hot Spots (Click Zones)
3. Text Input
4. Keystroke capture The basis of the sequence is a series of screen shots, or displays, that are selected for presentation to a viewer of the sequence. The authoring program allows a human operator to select screen shots, designate cursor movements, define "bubble" text, etc., in order to create a sequence. Other embodiments may automate the process where, for example, another computer program automatically performs one or more of the authoring steps described herein. Individual slides can be selected, brought into an edit view for editing, rearranged and otherwise manipulated by using either the main or list views. The slides can be selected by clicking on the slide's name, or graphic representation, in either of the views. Slide names can be changed by double clicking on the text for the slide name in either of the views. Slides can be edited by double clicking on the slide graphic in the main view. Slides can be copied, moved or duplicated within these views. Slides, or other images, can also be imported into the list and main views so that previously acquired screenshots, pre-made graphics, photographs, etc. can be incorporated into the sequence.

The viewer applets (Viewlets) are integrated with the server to quickly and easily obtain detailed reports on Viewlet usage and quiz responses. The Viewlet presentation is then made available for web conferencing. In one embodiment, a plurality of modes are provided to support different data sharing and collaboration: document sharing mode, application viewing mode, application sharing mode, and annotation mode.

The web-conferencing user can download and view the applet at any time. Sequence controls, similar to videocassette recorder controls, are provided to facilitate playback of the presentation. An added aspect of the invention allows presentations to include advertising. In one mode of advertising, an advertisement can be controlled by an ad server over the Internet. This allows a high-degree of customization and updating of advertisements.

A plurality of clients can be engaged in a data conference using a server. Each client includes an operating system, such as Windows and a document sharing application. One of the clients assumes the role of a presenter, and so includes an authoring application that is associated with the document to be shared. For example, the authoring application can be Qarbon's ViewletBuilder, the documents to be shared can be the Viewlets. In another example, the authoring application can be Microsoft Word, and the document to be shared can be a Microsoft Word document. In one embodiment, the Viewlet is configured as a browser plug-in that can be downloaded from the Internet and installed on a computer running a Windows-type operating system and a browser such as Windows Internet Explorer.

The presenter client would generate one or more Viewlets for use during the web conference. The client then invites conferees A . . . N to conference over the web. During the presentation, the presenting client shares the Viewlets with the conferee clients A . . . N. The conferees can view the Viewlets and also participate in the questions or surveys, if applicable. The results are collected and sent back to the server 102 for tabulation and viewing by the client. If necessary, the presenting client can issue corrective actions based on the tabulation. The presenting client can also provide the address or URL of the Viewlets for the conferees to download and view after the conference call.

The system automatically integrates the audio generated by the shared document such as the Viewlet with the sound generated by the conferees and the presenter. In one embodiment, the sound generated by the shared document is added to the voice of the web conference participants. In another embodiment, a sound fader is provided to smoothly transition the voice from the conference to the audio stored in the shared document and vice versa. In another embodiment, audio from the shared document is sent in a different channel than the sound from the conference participants and the remote computer combines both audio channels into one prior to generating sound from the computer for the conference participant to listen.

By way of example, a block diagram of a client computer running the Viewlet is discussed next. Computer preferably includes a processor, random access memory (RAM), a program memory (preferably a writable read-only memory (ROM) such as a flash ROM) and an input/output (I/O) controller coupled by a CPU bus. Computer may optionally include a hard drive controller which is coupled to a hard disk and CPU bus. The programmable processing system may be preprogrammed or it may be programmed (and reprogrammed) by downloading a program from another source (e.g., a floppy disk, CD-ROM, or another computer). Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Other user input devices such as a trackball, touch-screen, digitizing tablet, etc. can be used. In general, the computer system is illustrative of but one type of computer system, such as a desktop computer, suitable for use with the present invention.

The computers can be configured with many different hardware components and can be made in many dimensions and styles (e.g., laptop, palmtop, pentop, server, workstation, mainframe). Any hardware platform suitable for performing the processing described herein is suitable for use with the present invention. Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

In view of the discussion above, it should be apparent that the system provides many controls and features to allow an author to easily share an effective presentation over a web-conferencing call. Any software application that generates visual information is susceptible for use with the present invention. Further, the invention can be used to make presentations of other information that is not, necessarily, generated from an application program. An example is where images are being viewed in a viewer, such as a web browser. Or a web browser can be used to view web pages that are captured and made into a presentation. Operating system displays, such as file hierarchies, desktop views, etc., can be captured and formed into a presentation with the present invention. Digital video, such as streaming video, can also be captured, annotated and presented. Other images displayed on a computer can be subject matter for a presentation prepared by the authoring interface and tools of the present invention.

Although software of the present invention may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction. Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Portions of the system and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The system has been described in terms of specific examples which are illustrative only and are not to be construed as limiting. In addition to software, the system may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs) or suitably programmed field programmable gate arrays (FPGAs).

The present invention has been described in terms of specific embodiments, which are illustrative of the invention and not to be construed as limiting. Other embodiments are within the scope of the following claims. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A method for providing sales support using a call center, comprising:
   scanning a product descriptor using a telephone having a camera;
   placing a call to a sales support telephone center;
   routing the call to a remote call center; and
   receiving sales support from the remote call center
   wherein the scanned product descriptor is used to route the call to a pre-selected person knowledgeable with the product descriptor in a remote call center for sales support.

2. The method of claim 1, wherein the product descriptor is a bar code.

3. The method of claim 2, comprising converting an image of a bar code to digital data.

4. The method of claim 1, wherein the remote call center is coupled to a satellite link.

5. The method of claim 1, wherein the remote call center is coupled to a fiber-optic link.

6. The method of claim 1, comprising applying the product descriptor to route the call to a designated operator.

7. The method of claim 1, wherein the telephone is a cellular telephone.

8. The method of claim 1, comprising a receptionist at the call center to remotely handle reception tasks.

9. The method of claim 8, wherein an image and voice of the receptionist is transmitted to a remote location.

10. The method of claim 8, wherein an image and voice of a remote visitor is transmitted to the receptionist.

11. The method of claim 1, comprising providing a virtual receptionist using the call center.

12. The method of claim 11, comprising capturing information on the visit from a visitor, including contact information and the visitor's signature.

13. The method of claim 11, comprising notifying an employee by the remote call center operator that a visitor is in the lobby, and facilitating the visit.

14. The method of claim 11, comprising printing a badge through a printer coupled to the processor.

15. The method of claim 11, comprising capturing an image of the visitor.

16. A sales support system, comprising:
   a telephone having a camera to scan a product descriptor, the telephone used for placing a call to a sales support telephone center;
   a telephone network for routing the call from the telephone; and
   a remote call center to receive the call and to provide sales support for a product associated with the product descriptor
   wherein the scanned product descriptor is used to route the call to a pre-selected person knowledgeable with the product descriptor in a remote call center for sales support.

17. The system of claim 16, wherein the product descriptor comprises a bar code.

18. The system of claim 16, comprising code for converting an image of a bar code to digital data.

19. The system of claim 16, wherein the product descriptor comprises an image of a product.

20. A sales support system, comprising:

a telephone having a camera to scan a product descriptor, the telephone used for placing a call to a sales support telephone center;

a telephone network for routing the call from the telephone; and a remote call center to receive the call and to provide sales support for a product associated with the product descriptor, wherein the product descriptor comprises a bar code or an image of a product wherein the scanned product descriptor is used to route the call to a pre-selected person knowledgeable with the product descriptor in a remote call center for sales support.

* * * * *